United States Patent
Palanigounder et al.

(10) Patent No.: US 11,272,351 B2
(45) Date of Patent: Mar. 8, 2022

(54) SYSTEM AND METHOD THAT FACILITATE STEERING OF ROAMING

(71) Applicant: QUALCOMM Incorporated, San Diego, CA (US)

(72) Inventors: Anand Palanigounder, San Diego, CA (US); Adrian Edward Escott, Reading (GB); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/375,699

(22) Filed: Apr. 4, 2019

(65) Prior Publication Data
US 2019/0313238 A1 Oct. 10, 2019

Related U.S. Application Data

(60) Provisional application No. 62/653,281, filed on Apr. 5, 2018.

(51) Int. Cl.
*H04W 8/12* (2009.01)
*H04W 12/10* (2021.01)
(Continued)

(52) U.S. Cl.
CPC ............. *H04W 8/12* (2013.01); *H04L 9/3242* (2013.01); *H04W 8/20* (2013.01);
(Continued)

(58) Field of Classification Search
CPC ............. H04W 8/12; H04W 12/04031; H04W 12/1006; H04W 8/20; H04W 12/06; H04W 48/18; H04W 12/0431; H04L 9/3242
(Continued)

(56) References Cited

U.S. PATENT DOCUMENTS

| | | | |
|---|---|---|---|
| 2007/0191006 A1* | 8/2007 | Carpenter | H04W 48/16 455/435.2 |
| 2010/0322216 A1* | 12/2010 | Roger | H04W 12/069 370/338 |
| 2019/0268752 A1* | 8/2019 | Buckley | H04W 8/06 |

FOREIGN PATENT DOCUMENTS

| | | | |
|---|---|---|---|
| WO | 2019017689 A1 | 1/2019 | |
| WO | WO-2019068654 A1 * | 4/2019 | ........... H04L 9/3242 |

OTHER PUBLICATIONS

International Search Report and Written Opinion—PCT/US2019/026137—ISA/EPO—dated Jun. 4, 2019.
(Continued)

*Primary Examiner* — Ricky Q Ngo
*Assistant Examiner* — Ellen A Kirillova
(74) *Attorney, Agent, or Firm* — Loza & Loza LLP

(57) ABSTRACT

Aspects directed towards steering of roaming (SoR) are disclosed. In one example, a communication from a public land mobile network (PLMN) is received by a user equipment (UE) in which the communication indicates an acceptance of a UE registration with the PLMN. This example further includes performing a determination of whether an SoR indicator associated with a home PLMN (HPLMN) is embedded within the communication. The UE then manages PLMN selection according to the determination. In another example, a UE is configured to operate according to an SoR configuration in which the UE is configured to ascertain whether an SoR indicator is embedded within a communication from a PLMN. An SoR indicator associated with an HPLMN is then generated and subsequently transmitted from the HPLMN to the UE via the PLMN.

12 Claims, 10 Drawing Sheets

(51) Int. Cl.
  *H04W 8/20* (2009.01)
  *H04W 12/06* (2021.01)
  *H04L 9/32* (2006.01)
  *H04W 48/18* (2009.01)
  *H04W 12/106* (2021.01)
  *H04W 12/0431* (2021.01)
  *H04W 84/04* (2009.01)

(52) U.S. Cl.
  CPC ....... *H04W 12/0431* (2021.01); *H04W 12/06* (2013.01); *H04W 12/106* (2021.01); *H04W 48/18* (2013.01); *H04W 84/042* (2013.01)

(58) Field of Classification Search
  USPC ......................................................... 370/329
  See application file for complete search history.

(56) References Cited

OTHER PUBLICATIONS

Orange: "Living Document: Security of PLMN/RAT Selection Policies for Roaming" 3GPP Draft; S3-180371, 3rd Generation Partnership Project (3GPP), Mobile Competence Centre ; 650, Route Des Lucioles ; F-06921 Sophia-Antipolis Cedex France, vol. SA WG3, No. Gothenburg, Sweden; Jan. 22, 2018-Jan. 26, 2018, Jan. 26, 2018 (Jan. 26, 2018), XP051382723, 6 Pages. Retrieved from the Internet: URL:http://www.3gpp.org/ftp/Meetings%5F3GPP%6FSYNC/SA3/Docs/ [retrieved on Jan. 26, 2018] 3.2.1; p. 2.

Qualcomm Incorporated et al., "Updates to Solution #6 in SoR Living Doc", 3GPP Draft; S3-181502, 3rd Generation Partnership Project (3GPP), Mobile Competence Centre ; 650, Route Des Lucioles ; F-06921 Sophia-Antipolis Cedex; France, vol. SA WG3, No. Belgrade (Serbia); Apr. 16, 2018-Apr. 20, 2018, Apr. 20, 2018 (Apr. 20, 2018), XP051433238, 5 Pages, Retrieved from the Internet: URL:http://www.3gpp.org/ftp/Meetings%5F3GPP%5FSYNC/SA3/Docs/ [retrieved on Apr. 20, 2018].

Qualcomm Incorporated: "Proposed Solution and Conclusion for PLMN/RAT Selection" 3GPP Draft S3-180795, 3rd Generation Partnership Project (3GPP), Mobile Competence Centre , 650, Route Des Lucioles , F-06921 Sophia-AntiPolis Cedex, France , vol. SA WG3, No. San Diego (US); Feb. 26, 2018-Mar. 2, 2018, Feb. 19, 2018 (Feb. 19, 2018), XP051409208, 4 Pages, Retrieved from the Internet: URL:http://www.3gpp.org/ftp/tsg%5Fsa/WG3%5FSecurity/TSGS3%5F90Bis%5FSanDiego/Docs/ [retrieved on Feb. 19, 2018].

Orange: "Living Document: Security of PLMN/RAT Selection Policies for Roaming", 3GPP Draft, 3GPP TSG SA WG3 (Security) Meeting #90Bis, S3-180999, Feb. 26-Mar. 2, 2018, San Diego (US), 10 Pages.

Qualcomm Incorporated: "pCR: Support for Steering of Roaming UE in 5GS", 3GPP Draft; S3-180794, 3rd Generation Partnership Project (3GPP), Mobile Competence Centre ; 650, Route Des Lucioles ; F-06921 Sophia-Antipolis Cedex; France, vol. SA WG3, No. San Diego (US); Feb. 26, 2018-Mar. 2, 2018, Feb. 19, 2018 (Feb. 19, 2018), XP051409207, 9 Pages, Retrieved from the Internet: URL:http://www.3gpp.org/ftp/tsg%5Fsa/WG3%5FSecurity/TSGS3%5F90Bis%5FSanDiego/Docs/ [retrieved on Feb. 19, 2018], NAS security Mode command procedure; p. 7, paragraph 6.7.2—p. 8; figures 6.7.2-1.

* cited by examiner

SYSTEM AND METHOD THAT FACILITATE STEERING OF ROAMING

CROSS REFERENCE TO RELATED APPLICATIONS

The present application for patent claims priority to U.S. Provisional Applications No. 62/653,281 filed Apr. 5, 2018, which is hereby expressly incorporated by reference.

TECHNICAL FIELD

The technology discussed below relates generally to wireless communication systems, and more particularly, to a system and method that facilitate steering of roaming.

INTRODUCTION

As the demand for mobile broadband access continues to increase, research and development continue to advance wireless communication technologies not only to meet the growing demand for mobile broadband access, but to advance and enhance the user experience with mobile communications. Advances in roaming, for example, enable a user equipment (UE) to connect with a local network for sending and receiving data even when the UE is outside of the subscriber's service area. Typically, both the subscriber and the subscriber's regular mobile operator (i.e., the UE's home network), would prefer that the roaming be done via local operators with acceptable pricing and network quality. The option for the home network to select the hosting network while roaming is called steering of roaming (SoR).

In a fifth generation (5G) new radio (NR) access network, the ability to securely steer the roaming of a UE is particularly challenging. For instance, because a public land mobile network (PLMN) may not be willing to relay SoR information received from a home PLMN (HMPLN), a UE may never know whether it should steer away from a particular PLMN. Accordingly, it would be desirable to develop a system and methodology to reliably steer the roaming of UEs within a 5G network.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a user equipment or UE (e.g., a scheduled entity, mobile device, wireless device, mobile phone, etc.) are disclosed. In one example, a communication is received from a public land mobile network (PLMN) in which the communication indicates an acceptance of a UE registration with the PLMN. This example further includes performing a determination of whether a steering of roaming (SoR) indicator associated with a home PLMN (HPLMN) is embedded within the communication. The UE then manages PLMN selection according to the determination.

Various aspects directed towards a network entity (e.g., an HPLMN or scheduling entity) are also disclosed. In a particular example, a UE may be configured to operate according to an SoR configuration in which the UE is configured to determine whether an SoR indicator is embedded within a communication from a PLMN. An SoR indicator associated with an HPLMN is then generated and subsequently transmitted from the HPLMN to the UE via the PLMN.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

A first aspect provides a method operational at a wireless communication device, comprising: (a) configuring the wireless communication device to perform steering of roaming for wireless service; (b) receiving a communication from a public land mobile network (PLMN), the communication indicating an acceptance of a user equipment (UE) registration with the PLMN; (c) ascertaining whether a steering of roaming (SoR) indicator associated with a home PLMN (HPLMN) is embedded within the communication; and/or (d) managing PLMN selection for the wireless communication device according to the SoR indicator. Configuring the wireless communication device to perform steering of roaming for wireless service may include storing steering of roaming information within a universal subscriber identify module of the wireless communication device.

Additionally, an integrity check may be performed on the SoR indicator based on a key shared with the HPLMN. In one example, the key may be an Authentication Server Function (AUSF) key.

In another example, the key may be derived from an Authentication Server Function (AUSF) key.

The method may further include verifying integrity of the SoR indicator using a message authentication code (MAC-S) received as part of the communication.

According to one implementation, ascertaining whether the SoR indicator is embedded within the communication may comprise ascertaining that the SoR indicator is embedded within the communication; and the method may further comprise: (a) ascertaining whether the SoR indicator passes an integrity check; and (b) if the SoR indicator failed the integrity check, performing at least one of: (1) lowering a priority of the PLMN; or (2) switching from the PLMN to an alternative PLMN.

According to another implementation, ascertaining whether the SoR indicator is embedded within the communication may comprise ascertaining that the SoR indicator is not embedded within the communication; and the method may further comprises performing at least one of: (1) lowering a priority of the PLMN; or (b) switching from the PLMN to an alternative PLMN.

According to yet another implementation, ascertaining whether the SoR indicator is embedded within the communication may comprise ascertaining that the SoR indicator is embedded within the communication; and the method further comprises: (a) ascertaining whether the SoR indicator passes an integrity check; and (b) ascertaining whether the communication is further embedded with updated steering information. In one example, if the SoR indicator passes the integrity check, the method may further comprise updating steering information, if the communication is embedded with updated steering information. In another example, if the SoR indicator passes the integrity check, the method may further comprise remaining connected with the PLMN, if the communication is not embedded with updated steering information.

A second aspect provides a wireless communication device, comprising: a transceiver and a processing circuit. The transceiver configured to receive a communication from a public land mobile network (PLMN), the communication indicating an acceptance of a user equipment (UE) registration with the PLMN. The processing circuit may be configured to: (a) ascertain whether a steering of roaming (SoR) indicator associated with a home PLMN (HPLMN) is embedded within the communication; and (b) manage PLMN selection for the wireless communication device according to the SoR indicator.

The processing circuit may be further configured to: perform an integrity check on the SoR indicator based on a key shared with the HPLMN. In one example, the key may be an Authentication Server Function (AUSF) key or is derived from the Authentication Server Function (AUSF) key.

The processing circuit may be further configured to: (a) ascertain, upon receipt of the communication, whether the SoR indicator is embedded within the communication; and (b) ascertain, if the SoR indicator is embedded, whether the SoR indicator passes an integrity check. In one example, the processing circuit is further configured to lower a priority of the PLMN or switch to an alternative PLMN, if the SoR indicator is not embedded within the communication or the SoR indicator failed the integrity check.

A third aspect process a method operational at a network entity, comprising: (a) configuring a user equipment (UE) to operate according to a steering of roaming (SoR) configuration, wherein the SoR configuration comprises configuring the UE to ascertain whether an SoR indicator is embedded within a communication from a public land mobile network (PLMN); (b) obtaining the SoR indicator, wherein the SoR indicator is associated with a home PLMN (HPLMN); and/or (c) transmitting the SoR indicator to the UE via the PLMN.

In one example, obtaining the SoR indicator may comprise deriving the SoR indicator from a key shared with the UE. For instance, the key may be an Authentication Server Function (AUSF) key or is derived from the Authentication Server Function (AUSF) key.

The method may further comprise including the SoR indicator for calculating a message authentication code (MAC-S) prior to transmission.

In one example, the SoR configuration may further comprise configuring the UE to lower a priority of the PLMN, if the UE ascertains that the SoR indicator is not embedded within the communication from the PLMN or that the SoR indicator failed an integrity check. In another example, the SoR configuration may further comprise configuring the UE to switch from the PLMN to an alternative PLMN, if any alternative PLMNs are available.

In another instance, the SoR configuration may further comprise configuring the UE to ascertain whether the communication from the PLMN is further embedded with updated steering information, if the UE ascertains that the SoR indicator is embedded within the communication from the PLMN and that the SoR indicator passed an integrity check. The SoR configuration may further comprises configuring the UE to: (a) update steering information, if the communication from the PLMN is embedded with the updated steering information; and (b) remain connected with the PLMN, if the communication from the PLMN is not embedded with the updated steering information.

A fourth aspect provides a network device, comprising: a transceiver and a processing circuit. The transceiver may serve to communicate with one or more user equipment. The processing circuitry may be configured to: (a) configure a user equipment (UE) to operate according to a steering of roaming (SoR) configuration, wherein the SoR configuration comprises configuring the UE to ascertain whether an SoR indicator is embedded within a communication from a public land mobile network (PLMN); (b) obtain the SoR indicator, wherein the SoR indicator is associated with a home PLMN (HPLMN); and/or (c) transmit the SoR indicator to the UE via the PLMN. Obtaining the SoR indicator may comprise deriving the SoR indicator from a key shared with the UE. In one example, the key may be an Authentication Server Function (AUSF) key or is derived from the Authentication Server Function (AUSF) key. The processing circuit may be further configured to include the SoR indicator to calculate a message authentication code (MAC-S) prior to transmission.

DETAILED DESCRIPTION

Figure 1:
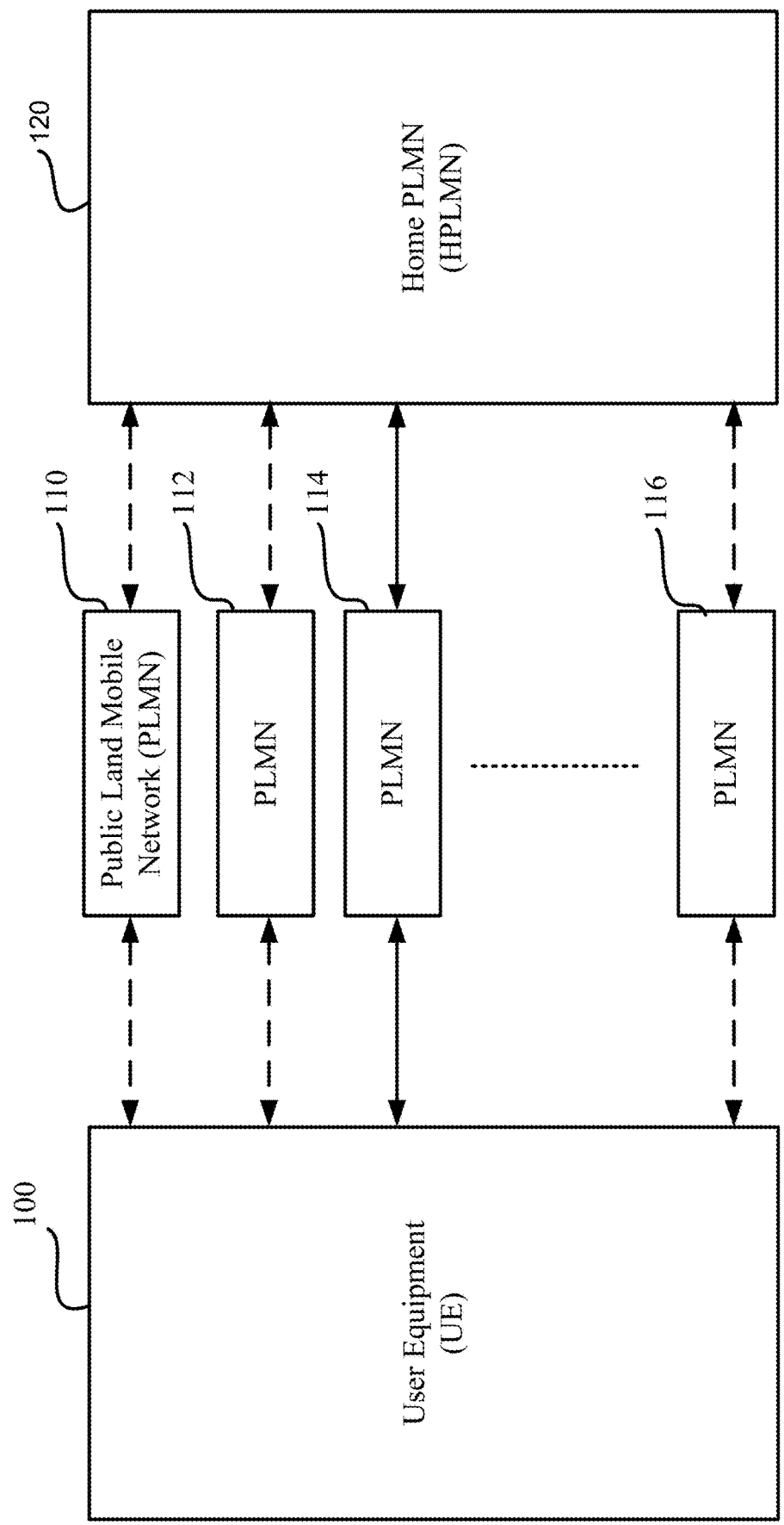
FIG. 1 is a block diagram illustrating an exemplary system that facilitates steering of roaming (SoR) in accordance with aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As used herein, a radio access technology (RAT) is a type of technology or communication standard utilized for radio access and communication over a wireless air interface. Just a few examples of RATs include Global System for Mobile communication (GSM), Universal Terrestrial Radio Access (UTRA), Evolved UTRA (E-UTRA), Long-Term Evolution (LTE), Bluetooth, and Wi-Fi.

Additionally, the term new radio (NR) may refer to 5G technologies and the new radio access technology undergoing definition and standardization by 3GPP in Release 15.

Overview

As previously stated, steering of roaming (SoR) allows a home network to redirect a user equipment (UE) to connect via their preferred roaming partner in a given location. The aspects disclosed herein are generally directed towards facilitating SoR within a fifth generation (5G) new radio (NR) access network using control plane messages during the UE registration process (i.e., before any user plane data is transmitted by the UE).

Particular aspects disclosed herein are directed towards a 5G SoR methodology that is effective even when a visited (i.e., roaming) network cannot be trusted to relay steering information received from a UE's home network. For instance, an SoR methodology is disclosed in which a home network that wants SoR capability transmits an SoR indicator to a UE via the visited (i.e., roaming) network as part of the UE registration, wherein the UE is configured by the HPLMN to determine whether to initiate steering of roaming procedures at the UE as part of the registration process based on whether the SoR indicator is actually received. If the HPLMN does not configure the UE, then the UE skips performing SoR procedures. If the UE is configured to perform steering of roaming and the SoR indicator is not received (or an integrity check of the SoR indicator fails), for example, the UE may be configured to set the currently visited (i.e., roaming) network at a lowest priority level so that the UE knows it should attempt to connect to an alternative roaming network, if possible. If an SoR indicator is indeed received (and the SoR indicator passes an integrity check), however, the UE may then be configured to steer roaming according to whether steering information from the home network is also received via the currently visited (i.e., roaming) network. For instance, if an SoR indicator is received without additional steering information, the UE may be configured to remain with the currently visited (i.e., roaming) network. Namely, if the home network concludes that the currently visited (i.e., roaming) network is acceptable, the home network may convey that conclusion by sending an SoR indicator to the UE without additional steering information. However, if the home network concludes that the currently visited (i.e., roaming) network is not acceptable, such conclusion may be communicated by sending an SoR indicator to the UE with additional steering information. The UE may then update the PLMN/RAT network selection information in its subscriber identification module (SIM) or Universal SIM (USIM) or in its internal memory to steer roaming according to the steering information received from the home network.

Referring next to FIG. 1, a block diagram is provided illustrating an exemplary system that facilitates an SoR methodology in accordance with aspects disclosed herein. Here, it is assumed that the UE 100 is configured with SoR capability, wherein the UE 100 in this particular example attempts to register with public land mobile network (PLMN) 114. In accordance with the aspects disclosed herein, it is contemplated that the home PLMN (HPMLN) 120 of the UE 100 may steer the UE 100 to any of a plurality of PLMNs, 110, 112, 114, or 116, by configuring the UE 100 to search for an SoR indicator embedded within a communication from the PLMN 114 during the registration process. As previously stated, since it is unknown whether the PLMN 114 will forward the SoR indicator generated by the HPMLN 120, the SoR methodology disclosed herein configures the UE 100 to infer a desired steering operation even if an SoR indicator is not received from the PLMN 114. For instance, if an SoR indicator is not received (or an integrity check of the SoR indicator fails), the UE 100 may be configured to set the PLMN 114 at a lowest priority level so that the UE 100 knows it should prioritize connecting to any of the alternative PLMNs, 110, 112, or 116, if possible. Otherwise, if an SoR indicator is indeed received (and the SoR indicator passes an integrity check), the UE 100 may then be configured to steer roaming according to whether steering information from the HPMLN 120 is also received via the PLMN 114. For instance, if an SoR indicator is received without additional steering information, the UE may be configured to remain with the PLMN 114. Otherwise, if an SoR indicator is received with additional steering information (e.g., a roaming list), the UE 100 may then update its network selection information or steering information maintained on its internal memory or the SIM to steer roaming according to the updated steering information (e.g., updated roaming list), which may include prioritizing any of the alternative PLMNs, 110, 112, or 116, over PLMN 114.

Figure 2:
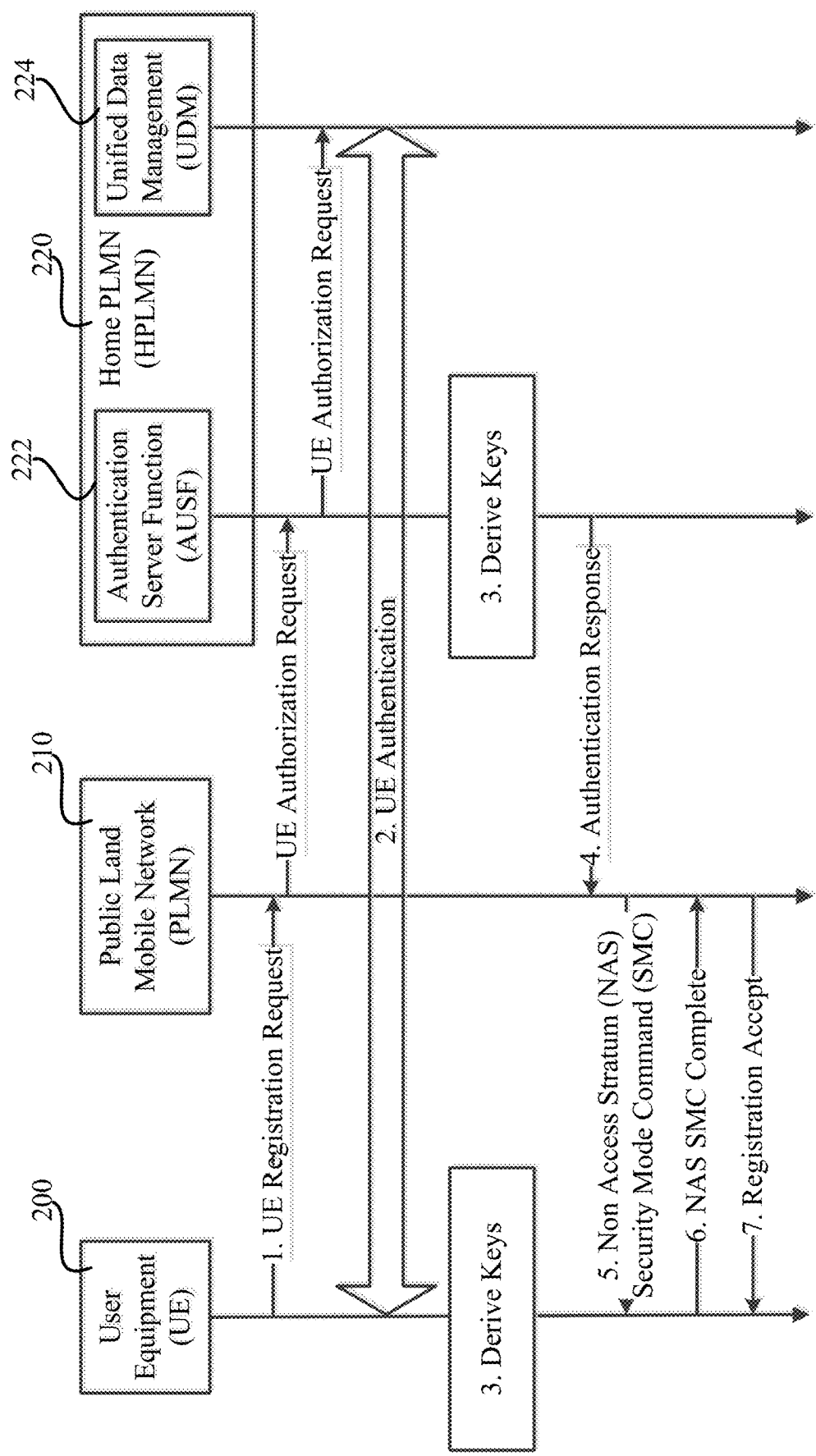
FIG. 2 is a timing diagram illustrating an exemplary user equipment (UE) registration with a public land mobile network (PLMN).

Referring next to FIG. 2, for reference purposes, a timing diagram is provided illustrating a conventional UE registration process with a PLMN. As illustrated, such process begins with a UE 200 sending a UE registration request to a PLMN 210, wherein the PLMN 210 may include an access and mobility management function (AMF) and a security anchor function (SEAF). The PLMN 210 then sends a UE authentication request (e.g., utilizing a Subscription Concealed Identifier (SUCI)) to the authentication server function (AUSF) 222 of the HPLMN 220, which then gets forwarded to the unified data management (UDM) 224 of the HPLMN 220. As illustrated, the UE 200 is then authenticated by the HPLMN 220 (e.g., via a 5G Authentication and Key Agreement (5G AKA) protocol or an Extensible Authentication Protocol Authentication and Key Agreement (EAP-AKA')), followed by the derivation of keys (e.g., $K_{AUSF}$ & $K_{SEAF}$) at the UE 200 and HPLMN 220. After the derivation of keys, the AUSF 222 sends an authentication response to the PLMN 210, which may include the $K_{SEAF}$ and a Subscription Permanent Identifier (SUPI). Upon receiving the authentication response from the AUSF 222, the PLMN 210 sends a non-access stratum (NAS) security mode command (SMC) to the UE 200. The UE 200 then provides a NAS SMC complete notification to the PLMN 210, which subsequently notifies the UE 200 that its registration has been accepted, as shown.

Figure 3:
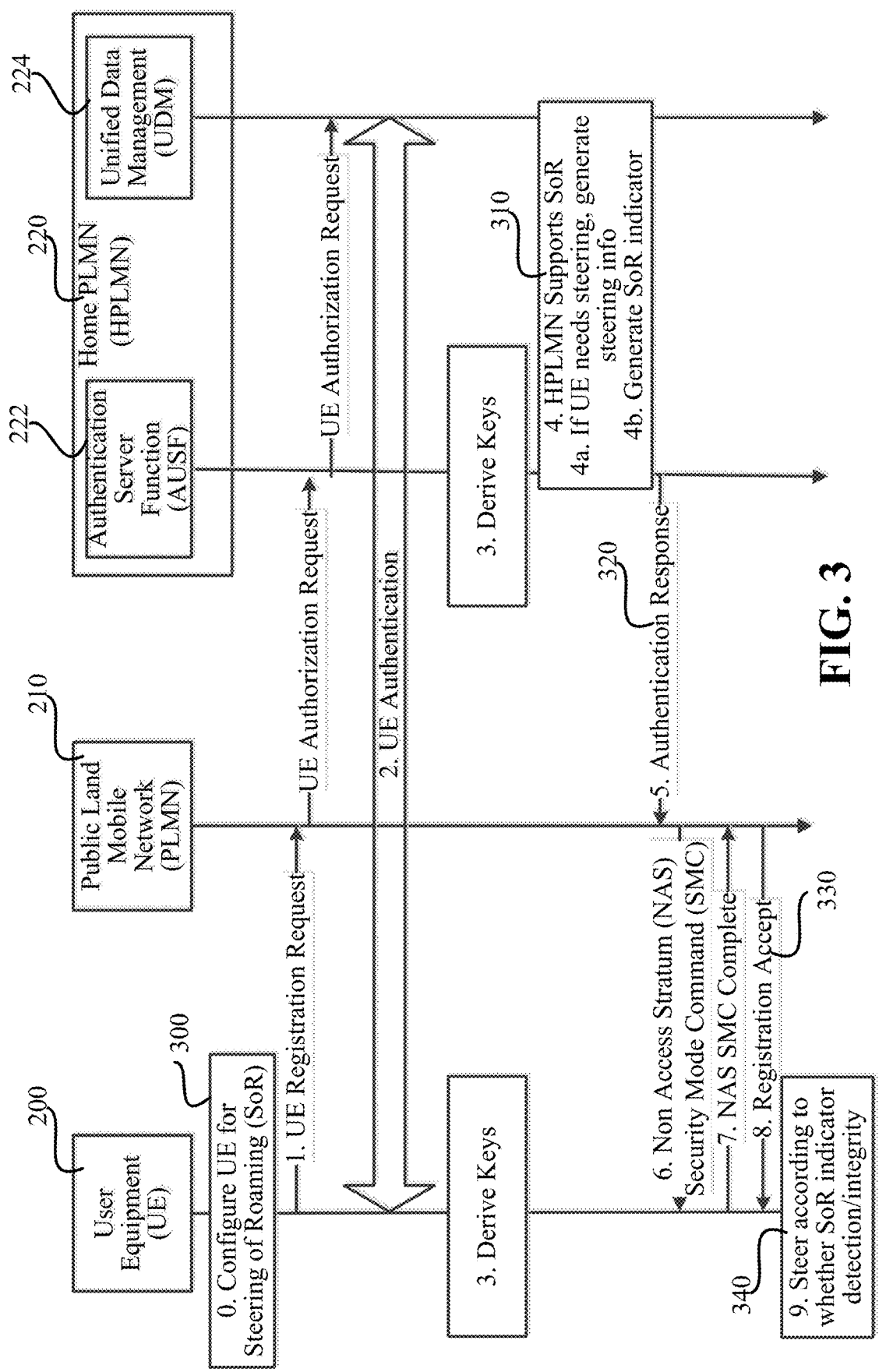
FIG. 3 is a timing diagram illustrating an exemplary process that facilitates transmitting an SoR indicator in accordance with aspects disclosed herein.

Referring next to FIG. 3, a timing diagram is provided illustrating an exemplary UE registration process that facilitates transmitting an SoR indicator in accordance with aspects disclosed herein. Here, it should be appreciated that steps 300, 310, 320, 330, and 340 are different from the process illustrated in FIG. 2. For instance, since the HPLMN 220 may not want the UE 200 to have SoR capability, it is contemplated that the UE may be initially configured 300 according to whether SoR capability is desired, wherein such configuration may comprise configuring the universal SIM (USIM) and/or the mobile entity (ME). If the UE 200 is not configured for SoR capability, then the UE 200 may skip, omit, or forgo such steering 340.

If the HPLMN 220 supports SoR in accordance with the aspects disclosed herein, an SoR indicator is generated 310 by the HPLMN 220. Namely, it is contemplated that the HPLMN 220 will utilize information collected during the UE registration process to determine whether the UE 200 should be steered away from PLMN 210. If steering is indeed desired, the HPLMN 220 will generate steering information (e.g., a roaming list that the UE can use to roam), in addition to the SoR indicator. In one example, the SoR indicator generation may include an accompanying updated roaming list (i.e., updated steering information). Otherwise, if the HPLMN 220 concludes that steering is not needed (i.e., that PLMN 210 is acceptable), the HPLMN 220 may simply generate the SoR indicator without including the steering information.

In a particular aspect disclosed herein, it is contemplated that the SoR indicator is embedded within a message authentication code (MAC-S) generated 310 by the HPLMN 220. The MAC-S may then be sent 320 (e.g., as part of an authentication response message) together with steering information (if steering information is needed) to the PLMN 210, and subsequently forwarded 330 to the UE 200 (e.g., as part of a registration accept message).

It should be appreciated that, by embedding the SoR indicator within a MAC-S, the integrity of the SoR indicator may be protected. To this end, it should be further appreciated that the SoR methodology disclosed herein may also include having the UE 200 perform an integrity check (e.g., via the ME of UE 200) on the MAC-S received from the PLMN 210. Namely, it is contemplated that the UE 200 may be configured to, prior to performing steering 340, determine both whether the MAC-S was received and whether the integrity of such received MAC-S can be confirmed or verified. For instance, the UE 200 may compute/calculate a local version of the received MAC-S, e.g., by using the same key derivation function KDF and steering information, to confirm whether the received MAC-S and locally computed MAC-S are the same. Other ways of verifying the MAC-S are also contemplated herein. If the locally computed MAC-S is the same as the received MAC-S, then integrity is successfully verified. If either the MAC-S is not received or the integrity check fails, the UE 200 may be configured to set the PLMN 210 at a lowest priority level so that the UE 200 knows it should prioritize connecting to an alternative PLMN, if possible.

Otherwise, if the MAC-S is indeed received and it passes an integrity check, then the UE 200 may determine whether the received communication 330 included steering information (e.g., a roaming list). If steering information was indeed included, the UE 200 shall update its network selection information and then perform PLMN selection (e.g., in accordance with the received steering information). Otherwise, if steering information was not included, the UE 200 simply remains connected with the PLMN 210.

In another aspect of the disclosure, it is contemplated that the integrity of the SoR indicator may be further protected by utilizing a key (e.g., $K_{AUSF}$ or a key(s) derived from it) shared between the UE 200 and the HPLMN 220. For instance, the HPLMN 220 may derive/generate/calculate 310 the MAC-S(SoR indicator) from the $K_{AUSF}$ according to a key derivation function (KDF) such as SHA256, wherein MAC-S=KDF ($K_{AUSF}$, <steering info>, Function Code)

Here, it should be appreciated that, if no steering information is needed, the steering information field may be set to null (i.e., x00 value) or omitted. It should also be appreciated that a fixed length of the KDF output (e.g., 64 or 128 least significant bits) may be used as the MAC-S.

Exemplary Wireless Communication Environment

Figure 4:
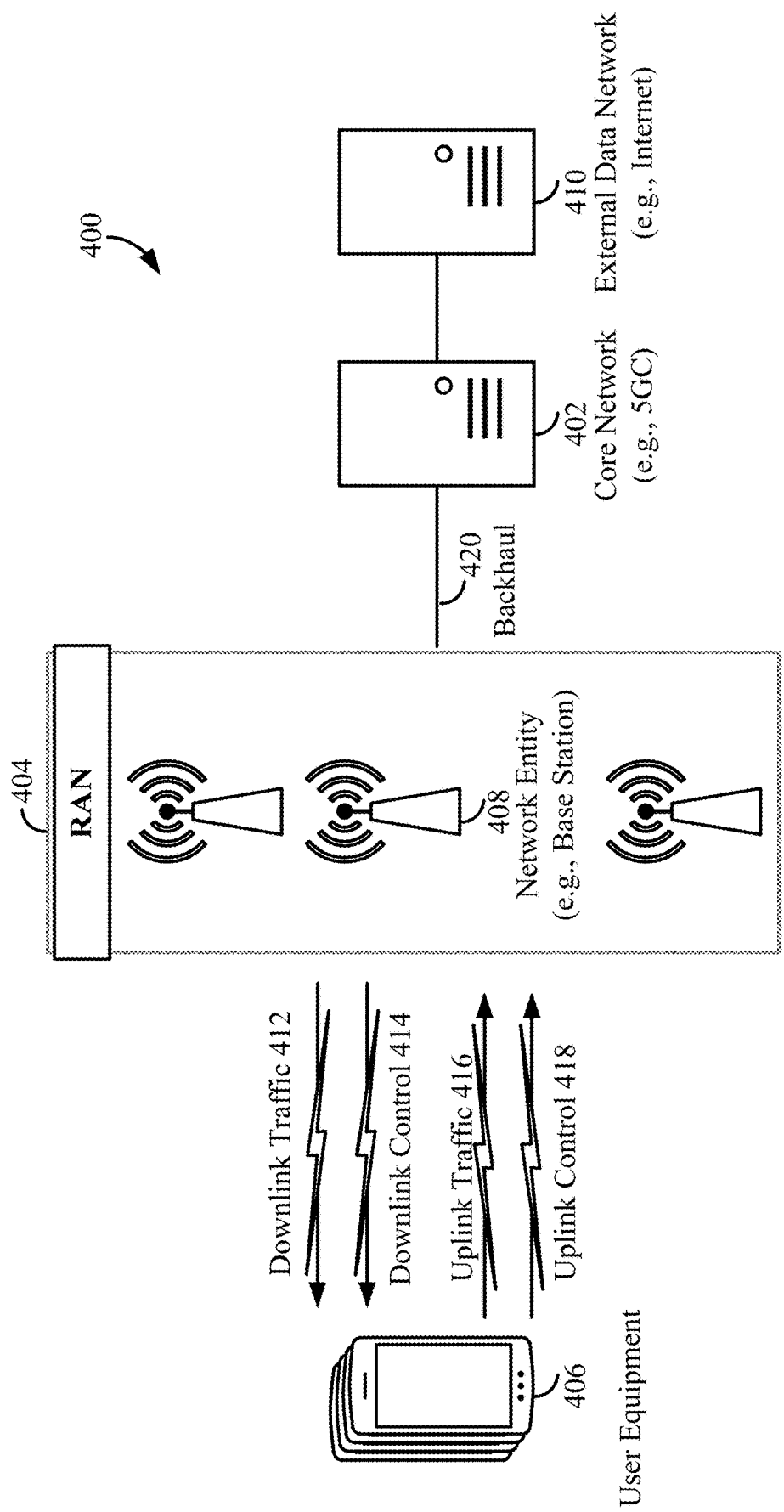
FIG. 4 is a schematic illustration of a wireless communication system.

The various concepts presented throughout this disclosure may be implemented across a broad variety of telecommunication systems, network architectures, and communication standards. Referring now to FIG. 4, as an illustrative example without limitation, various aspects of the present disclosure are illustrated with reference to a wireless communication system 400. The wireless communication system 400 includes three interacting domains: a core network 402, a radio access network (RAN) 404, and a user equipment (UE) 406. By virtue of the wireless communication system 400, the UE 406 may be enabled to carry out data communication with an external data network 410, such as (but not limited to) the Internet.

The RAN 404 may implement any suitable wireless communication technology or technologies to provide radio access to the UE 406. As one example, the RAN 404 may operate according to 3$^{rd}$ Generation Partnership Project (3GPP) New Radio (NR) specifications, often referred to as 5G. As another example, the RAN 404 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 404 includes a plurality of base stations 408. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 404 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 404 and a UE 406 may be described as utilizing an air interface. Transmissions over the air interface from a base station (e.g., base station 408) to one or more UEs (e.g., UE 406) may be referred to as downlink (DL) transmission. In accordance with certain aspects of the present disclosure, the term downlink may refer to a point-to-multipoint transmission originating at a network entity (described further below; e.g., base station 408 or scheduling entity). Another way to describe this scheme may be to use the term broadcast channel multiplexing. Transmissions from a UE (e.g., UE 406) to a base station (e.g., base station 408) may be referred to as uplink (UL) transmissions. In accordance with further aspects of the present disclosure, the term uplink may refer to a point-to-point transmission originating at a UE (described further below; e.g., UE 406).

In some examples, access to the air interface may be scheduled, wherein a network entity (e.g., a base station 408) allocates resources for communication among some or all devices and equipment within its service area or cell. Within the present disclosure, as discussed further below, the network entity may be responsible for scheduling, assigning, reconfiguring, and releasing resources for one or more scheduled entities. That is, for scheduled communication, UEs 406, which may be scheduled entities, may utilize resources allocated by the network entity 408.

Base stations 408 are not the only entities that may function as scheduling entities. That is, in some instances, a UE may function as a network entity, scheduling resources for one or more scheduled entities (e.g., one or more other UEs).

As illustrated in FIG. 4, a network entity 408 may broadcast downlink traffic 412 to one or more scheduled entities 406. Broadly, the network entity 408 is a node or device responsible for scheduling traffic in a wireless communication network, including the downlink traffic 412 and, in some examples, uplink traffic 416 from one or more scheduled entities 406 to the network entity 408. On the other hand, the UE 406 is a node or device that receives downlink control information 414, including but not limited to scheduling information (e.g., a grant), synchronization or timing information, or other control information from another entity in the wireless communication network such as the network entity 408.

In general, base stations 408 may include a backhaul interface for communication with a backhaul portion 420 of the wireless communication system. The backhaul 420 may provide a link between a base station 408 and the core network 402. Further, in some examples, a backhaul network may provide interconnection between the respective base stations 408. Various types of backhaul interfaces may be employed, such as a direct physical connection, a virtual network, or the like using any suitable transport network.

The core network 402 may be a part of the wireless communication system 400, and may be independent of the radio access technology used in the RAN 404. In some examples, the core network 402 may be configured according to 5G standards (e.g., 5GC). In other examples, the core network 402 may be configured according to a 4G evolved packet core (EPC), or any other suitable standard or configuration.

Figure 5:
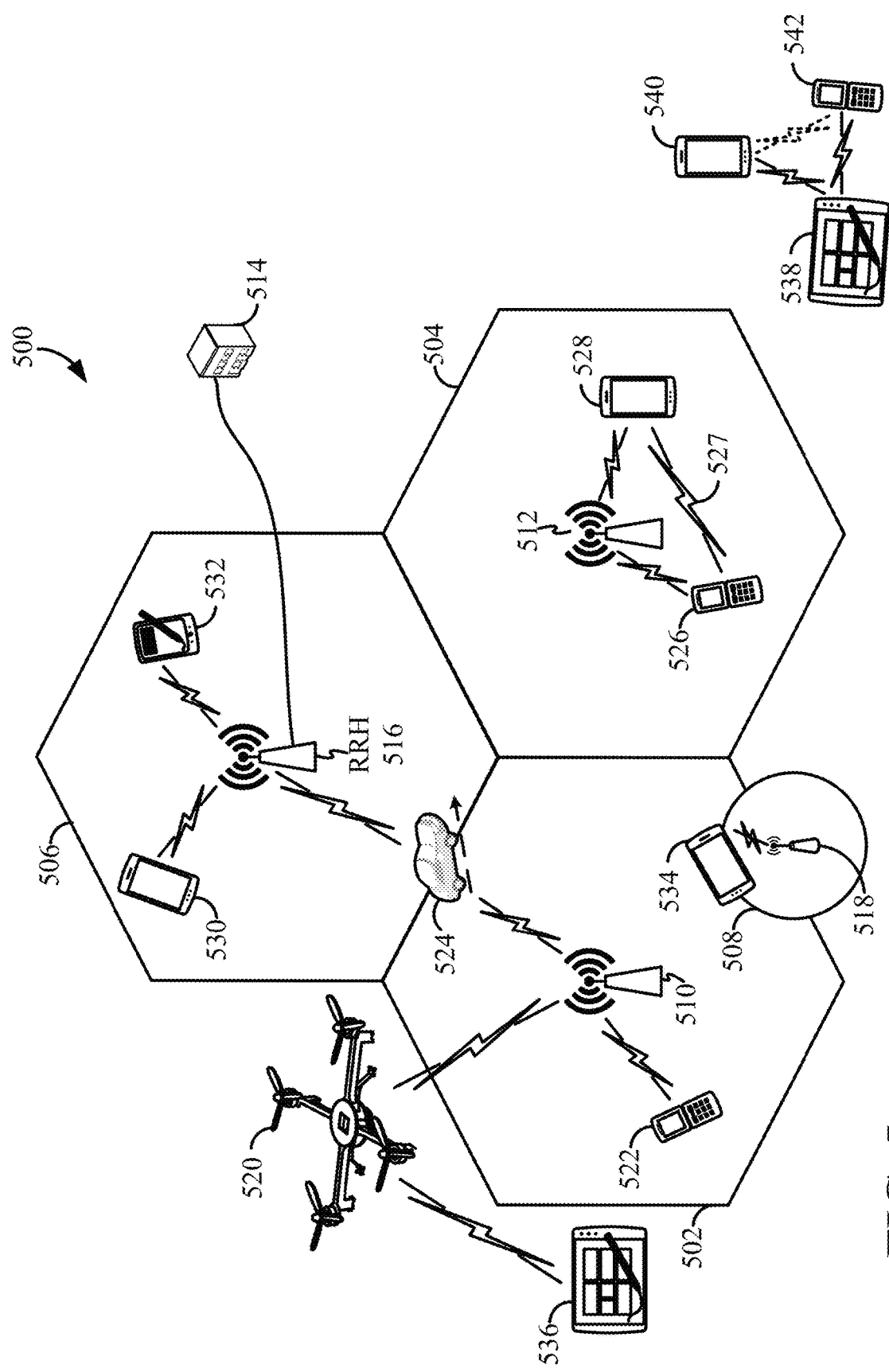
FIG. 5 is a conceptual illustration of an example of a radio access network.

Referring now to FIG. 5, by way of example and without limitation, a schematic illustration of a RAN 500 is provided. In some examples, the RAN 500 may be the same as the RAN 404 described above and illustrated in FIG. 4. The geographic area covered by the RAN 500 may be divided into cellular regions (cells) that can be uniquely identified by a user equipment (UE) based on an identification broadcasted from one access point or base station. FIG. 5 illustrates macrocells 502, 504, and 506, and a small cell 508, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 5, two base stations 510 and 512 are shown in cells 502 and 504; and a third base station 514 is shown controlling a remote radio head (RRH) 516 in cell 506. That is, a base station can have an integrated antenna or can be connected to an antenna or RRH by feeder cables. In the illustrated example, the cells 502, 504, and 506 may be referred to as macrocells, as the base stations 510, 512, and 514 support cells having a large size. Further, a base station 518 is shown in the small cell 508 (e.g., a microcell, picocell, femtocell, home base station, home Node B, home eNode B, etc.) which may overlap with one or more macrocells. In this example, the cell 508 may be referred to as a small cell, as the base station 518 supports a cell having a relatively small size. Cell sizing can be done according to system design as well as component constraints.

It is to be understood that the radio access network 500 may include any number of wireless base stations and cells. Further, a relay node may be deployed to extend the size or coverage area of a given cell. The base stations 510, 512, 514, 518 provide wireless access points to a core network for any number of mobile apparatuses. In some examples, the base stations 510, 512, 514, and/or 518 may be the same as the base station/network entity 408 described above and illustrated in FIG. 4.

FIG. 5 further includes a quadcopter or drone 520, which may be configured to function as a base station. That is, in some examples, a cell may not necessarily be stationary, and the geographic area of the cell may move according to the location of a mobile base station such as the quadcopter 520.

Within the RAN 500, the cells may include UEs that may be in communication with one or more sectors of each cell. Further, each base station 510, 512, 514, 518, and 520 may be configured to provide an access point to a core network 402 (see FIG. 4) for all the UEs in the respective cells. For example, UEs 522 and 524 may be in communication with base station 510; UEs 526 and 528 may be in communication with base station 512; UEs 530 and 532 may be in communication with base station 514 by way of RRH 516; UE 534 may be in communication with base station 518; and UE 536 may be in communication with mobile base station 520. In some examples, the UEs 522, 524, 526, 528, 530, 532, 534, 536, 538, 540, and/or 542 may be the same as the UE 406 described above and illustrated in FIG. 4.

In some examples, a mobile network node (e.g., quadcopter 520) may be configured to function as a UE. For example, the quadcopter 520 may operate within cell 502 by communicating with base station 510.

In a further aspect of the RAN 500, sidelink signals may be used between UEs without necessarily relying on scheduling or control information from a base station. For example, two or more UEs (e.g., UEs 526 and 528) may communicate with each other using peer to peer (P2P) or sidelink signals 527 without relaying that communication through a base station (e.g., base station 512). In a further example, UE 538 is illustrated communicating with UEs 540 and 542. Here, the UE 538 may function as a scheduling entity or a primary sidelink device, and UEs 540 and 542 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 540 and 542 may optionally communicate directly with one another in addition to communicating with the scheduling entity 538. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 500, the ability for a UE to communicate while moving, independent of its location, is referred to as mobility. The various physical channels between the UE and the radio access network are generally set up, maintained, and released under the control of an access and mobility management function (AMF, not illustrated, part of the core network 402 in FIG. 4), which may include a security context management function (SCMF) that manages the security context for both the control plane and the user plane functionality, and a security anchor function (SEAF) that performs authentication.

In various aspects of the disclosure, a radio access network 500 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 524 (illustrated as a vehicle, although any suitable form of UE may be used) may move from the geographic area corresponding to its serving cell 502 to the geographic area corresponding to a neighbor cell 506. When the signal strength or quality from the neighbor cell 506 exceeds that of its serving cell 502 for a given amount of time, the UE 524 may transmit a reporting message to its serving base station 510 indicating this condition. In response, the UE 524 may receive a handover command, and the UE may undergo a handover to the cell 506.

In a network configured for UL-based mobility, UL reference signals from each UE may be utilized by the network to select a serving cell for each UE. In some examples, the base stations 510, 512, and 514/516 may broadcast unified synchronization signals (e.g., unified Primary Synchronization Signals (PSSs), unified Secondary Synchronization Signals (SSSs) and unified Physical Broadcast Channels (PBCH)). The UEs 522, 524, 526, 528, 530, and 532 may receive the unified synchronization signals, derive the carrier frequency and slot timing from the synchronization signals, and in response to deriving timing, transmit an uplink pilot or reference signal. The uplink pilot signal transmitted by a UE (e.g., UE 524) may be concurrently received by two or more cells (e.g., base stations 510 and 514/516) within the radio access network 500. Each of the cells may measure a strength of the pilot signal, and the radio access network (e.g., one or more of the base stations 510 and 514/516 and/or a central node within the core network) may determine a serving cell for the UE 524. As the UE 524 moves through the radio access network 500, the network may continue to monitor the uplink pilot signal transmitted by the UE 524. When the signal strength or quality of the pilot signal measured by a neighboring cell exceeds that of the signal strength or quality measured by the serving cell, the network 500 may handover the UE 524 from the serving cell to the neighboring cell, with or without informing the UE 524.

Although the synchronization signal transmitted by the base stations 510, 512, and 514/516 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 500 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 500 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 500 may utilize one or more multiplexing and multiple access algorithms to enable simultaneous communication of the various devices. For example, 5G NR specifications provide multiple access for UL transmissions from UEs 522 and 524 to base station 510, and for multiplexing for DL transmissions from base station 510 to one or more UEs 522 and 524, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 510 to UEs 522 and 524 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

It should be appreciated that the channels or carriers described above are not necessarily all the channels or carriers that may be utilized between a scheduling entity and scheduled entities, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 10:
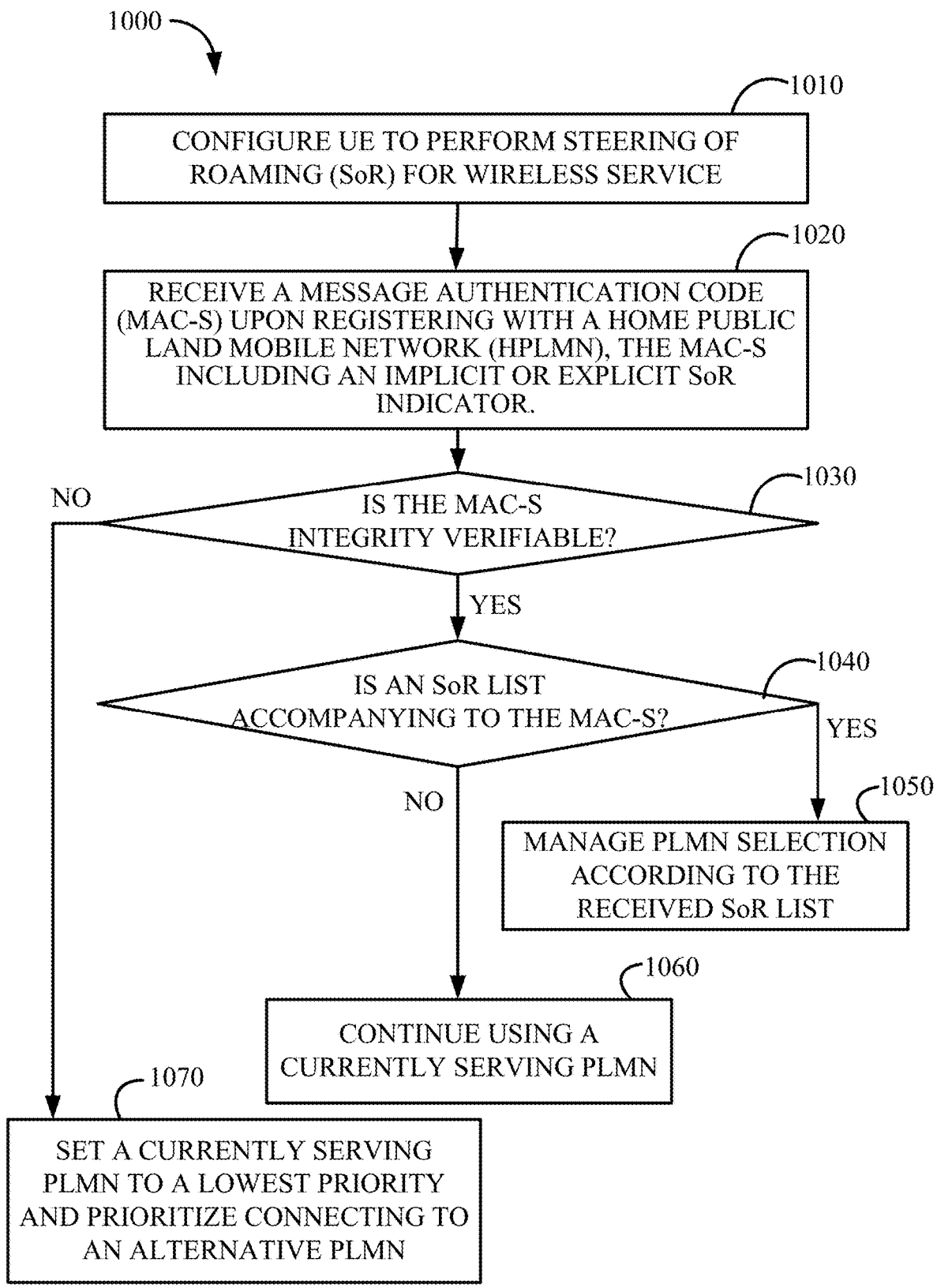
FIG. 10 illustrates another exemplary method for implementing steering of roaming (SoR) within a wireless device or user equipment/device (UE).

FIG. 10 illustrates another exemplary method for implementing steering of roaming (SoR) within a wireless device or user equipment/device (UE). The UE may be seek to obtain service through a currently serving PLMN. The UE may be configured to perform steering of roaming for wireless service 1010. The UE may receive a message authentication code (MAC-S) upon registering with a home public land mobile network (HPLMN), the MAC-S including an implicit or explicit SoR indicator 1020.

The UE may verify the MAC-S integrity 1040. If such MAC-S integrity verification fails (i.e., the received MAC-S does not match the information received), then UE may set a currently serving PLMN to a lowest priority and/or may prioritize connecting to an alternative PLMN 1070. If the MAC-S integrity is successfully verified, then the UE determines whether an SoR list (e.g., updated steering information) accompanies the MAC-S 1040. If such SoR list is available, then the UE manages PLMN selection according to the received SoR list 1050. Otherwise, if no updated SoR list is available, the UE continues using the currently serving PLMN.

Exemplary Network Entity

Figure 6:
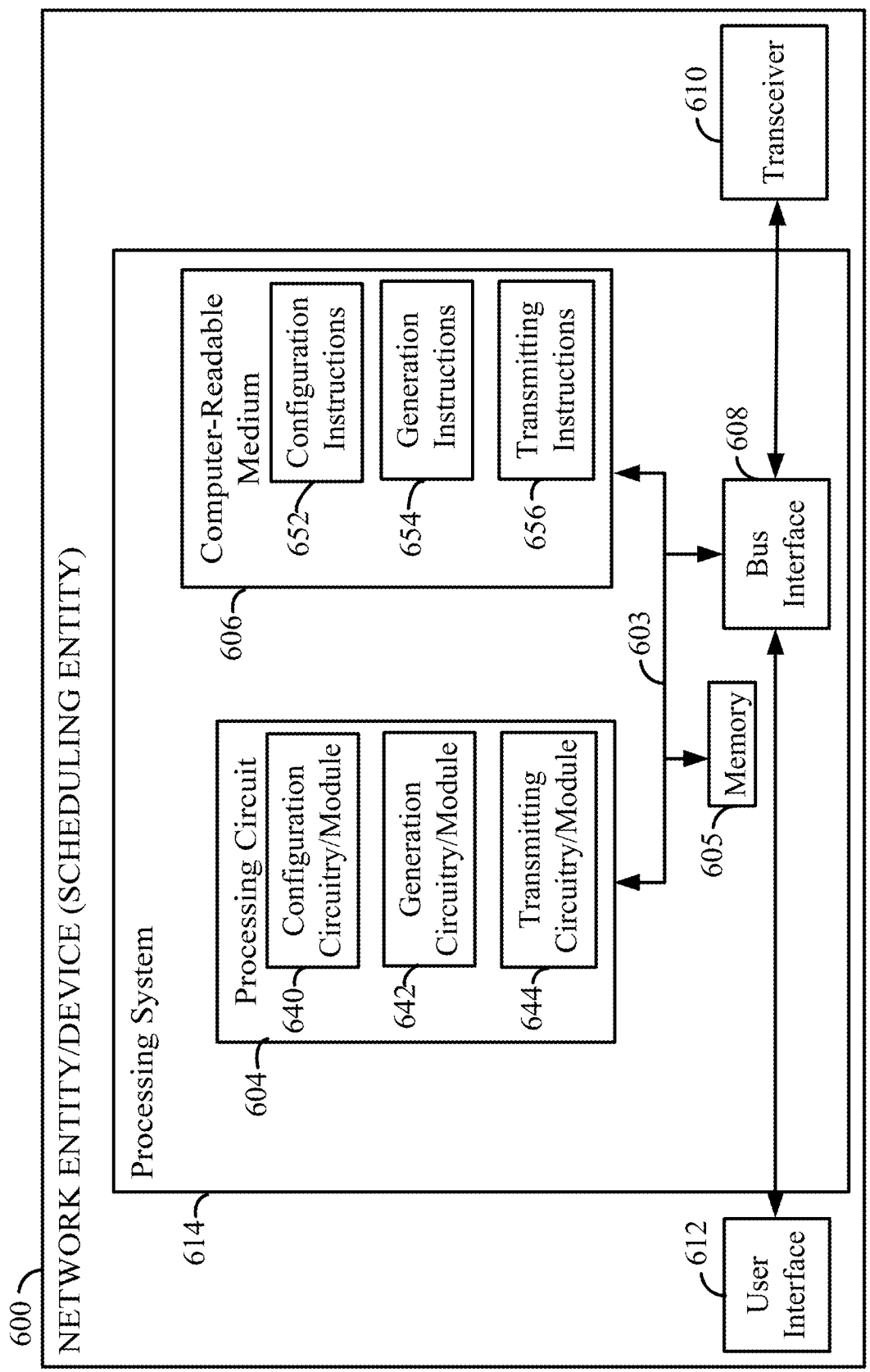
FIG. 6 is a block diagram illustrating an example of a hardware implementation for a network entity employing a processing system in accordance with aspects disclosed herein.

FIG. 6 is a block diagram illustrating an example of a hardware implementation for a network entity 600 employing a processing system 614. For example, the network entity 600 may be a user equipment (UE) as illustrated in any one or more of the FIGS. disclosed herein. In another example, the network entity 600 may be a base station as also illustrated in any one or more of the FIGS. disclosed herein.

The network entity/device 600 may be implemented with a processing system 614 that includes a processing circuit 604 (e.g., one or more processors). Examples of the processing circuit 604 includes microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity/device 600 may be configured to perform any one or more of the functions described herein. That is, the processing circuit 604, as utilized in a network entity/device 600, may be used to implement any one or more of the processes and procedures described below and illustrated in FIG. 7.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including the processing circuit 604, a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610 (e.g., a transmitter and receiver circuit or module). The transceiver 610 provides a communication interface or means for communicating with various other apparatus over a transmission medium. Depending upon the nature of the apparatus, a user interface 612 (e.g., keypad, display, speaker, microphone, joystick) may also be provided.

In some aspects of the disclosure, the processing circuit 604 may include a configuration circuitry 640 configured for various functions, including, for example, to configure a UE 800 (e.g., scheduled entity, wireless communication device, mobile device, mobile phone, etc.) to operate according to a steering of roaming (SoR) configuration in which the UE is configured to determine whether an SoR indicator is embedded within a communication from a public land mobile network (PLMN). As illustrated, the processing circuit 604 may also include a generation circuitry 642 configured for various functions. For instance, the generation circuitry 642 may be configured to generate the SoR indicator, wherein the SoR indicator is associated with a home PLMN (HPLMN). The processing circuit 604 may further include transmitting circuitry 644 configured for various functions, including, for example, to transmit the SoR indicator from the HPLMN to the UE via the PLMN. To this end, it should be appreciated that, the combination of the configuration circuitry 640, the generation circuitry 642, and the transmitting circuitry 644 may be configured to implement one or more of the functions described herein.

Various other aspects of the network entity/device 600 are also contemplated. For instance, it is contemplated that the generation circuitry 642 may be configured to generate the SoR indicator in any of a plurality of ways. Generation circuitry 642 may, for example, be configured to embed the SoR indicator within a message authentication code (MAC-S). Generation circuitry 642 may also be configured to derive the SoR indicator in any of a plurality of ways. For instance, it is contemplated that the generation circuitry 642 may be configured to derive the SoR indicator from a key shared with the UE (e.g., an Authentication Server Function (AUSF) key or a key derived from the AUSF key).

In another aspect of the disclosure, it is contemplated that the SoR configuration may include configuring the UE to lower a priority of the PLMN, if the UE determines that the SoR indicator is not embedded within the communication from the PLMN or that the SoR indicator failed an integrity check. If the UE determines that the SoR indicator is not embedded within the communication or that the SoR indicator failed an integrity check, the SoR configuration may further comprise configuring the UE to switch from the PLMN to an alternative PLMN, if any alternative PLMNs are available.

The SoR configuration may also include configuring the UE to ascertain whether the communication from the PLMN is further embedded with updated steering information, if the UE determines that the SoR indicator is embedded within the communication from the PLMN and that the SoR indicator passed an integrity check. Here, the SoR configuration may then further comprise configuring the UE to update steering information, if the communication from the PLMN is embedded with the updated steering information. Alternatively, the SoR configuration may comprise configuring the UE to remain connected with the PLMN, if the communication from the PLMN is not embedded with the updated steering information.

Referring back to the remaining components of network entity/device 600, it should be appreciated that the processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include configuration instructions 652 to execute various functions, including, for example, to configure a UE 800 (e.g., scheduled entity, wireless communication device, mobile device, mobile phone, etc.) to operate according to a SoR configuration in which the UE is configured to determine whether an SoR indicator is embedded within a communication from a PLMN. As illustrated, the computer-readable storage medium 606 may also include generation software 654 configured for various functions. For instance, the generation instructions 654 may serve to generate the SoR indicator, wherein the SoR indicator is associated with a home PLMN (HPLMN). The computer-readable storage medium 606 may further include transmitting instructions 656 to execute various functions, including, for example, to transmit the SoR indicator from the HPLMN to the UE via the PLMN.

In a particular configuration, it is also contemplated that the network entity/device 600 includes means for configuring a UE to operate according to an SoR configuration, means for generating an SoR indicator, and means for transmitting the SoR indicator. In one aspect, the aforementioned means may be the processor(s) 604 configured to perform the functions recited by the aforementioned means. In another aspect, the aforementioned means may be a circuit or any apparatus configured to perform the functions recited by the aforementioned means.

Figure 7:
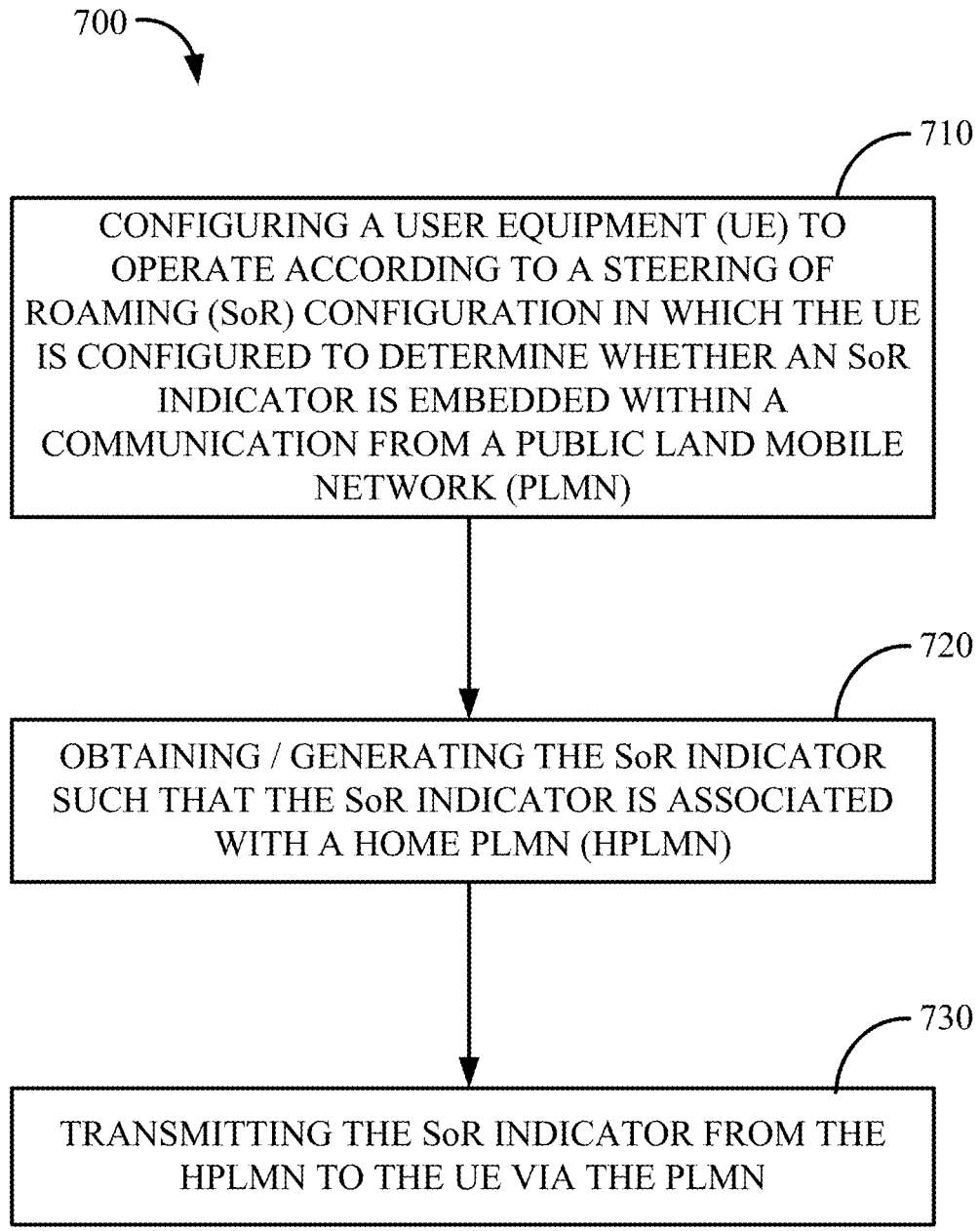
FIG. 7 is a flow chart illustrating an exemplary network entity process that facilitates some aspects of the disclosure.

Of course, in the above examples, the circuitry included in the processing circuit 604 is merely provided as an example, and other means for carrying out the described functions may be included within various aspects of the present disclosure, including but not limited to the instructions stored in the computer-readable storage medium 606, or any other suitable apparatus or means described herein and utilizing, for example, the processes and/or algorithms described in relation to FIG. 7.

In FIG. 7, a flow chart is provided, which illustrates an exemplary network entity process that facilitates some aspects of the disclosure. As described below, some or all illustrated features may be omitted in a particular implementation within the scope of the present disclosure, and some illustrated features may not be required for implementation of all embodiments. In some examples, the process 700 may be carried out by the network entity/device 600 illustrated in FIG. 6. In some examples, the process 700 may be carried out by any suitable apparatus or means for carrying out the functions or algorithm described below.

Process 700 begins at block 710 with the network entity/device 600 configuring a UE to operate according to an SoR configuration in which the UE is configured to determine whether an SoR indicator is embedded within a communication from a PLMN. Process 700 then proceeds to block 720 where the network entity 600 obtains (e.g., receives) or generates the SoR indicator such that the SoR indicator is associated with a HPLMN. Process 700 then concludes at block 730 where the network entity 600 transmits the SoR indicator from the HPLMN to the UE via the PLMN.

Exemplary User Equipment

Figure 8:
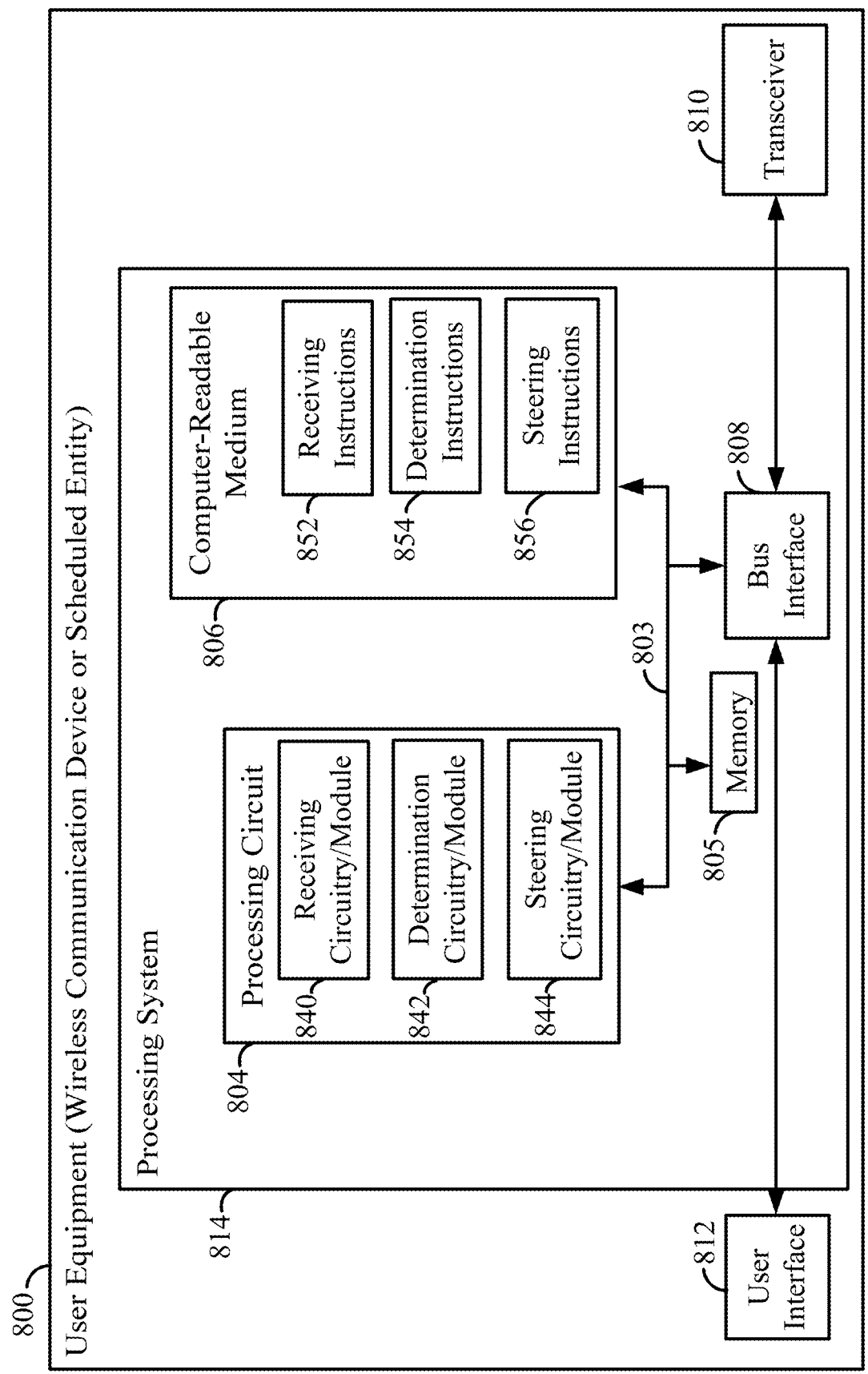
FIG. 8 is a block diagram illustrating an example of a hardware implementation for a user equipment employing a processing system in accordance with aspects disclosed herein.

FIG. 8 is a conceptual diagram illustrating an example of a hardware implementation for an exemplary user equipment (UE) 800 employing a processing system 814. In accordance with various aspects of the disclosure, an element, or any portion of an element, or any combination of elements may be implemented with a processing system 814. For example, the UE 800 may be a wireless device, a mobile device, a mobile phone, a scheduled entity, etc.

The processing system 814 may be substantially the same as the processing system 614 illustrated in FIG. 6, including a bus interface 808, a bus 802, memory 805, a processing circuit 804 (e.g., one or more processors), and a computer-readable medium 806. Furthermore, the UE 800 may include a user interface 812 and a transceiver 810 substantially similar to those described above in FIG. 6. That is, the processing circuit 804, as utilized in a UE 800, may be used to implement any one or more of the processes described below and illustrated in the various figures.

In some aspects of the disclosure, the processing circuit 804 may include a receiving circuitry 840 configured for various functions, including, for example, to receive a communication from a public land mobile network (PLMN), wherein the communication indicates an acceptance of a UE registration with the PLMN. As illustrated, the processing circuit 804 may also include determination circuitry 842 configured for various functions. For instance, determination circuitry 842 may be configured to perform a determination of whether a steering of roaming (SoR) indicator associated with a home PLMN (HPLMN) is embedded within the communication. The processing circuit 804 may further include steering circuitry 844 configured for various functions, including, for example, to manage PLMN selection according to the determination. To this end, it should be appreciated that, the combination of the receiving circuitry 840, the determination circuitry 842, and the steering circuitry 844 may be configured to implement one or more of the functions described herein.

Various other aspects for UE 800 are also contemplated. For instance, it is contemplated that the determination circuitry 842 may be configured to determine whether an SoR indicator is embedded within the communication in any of a plurality of ways. Determination circuitry 842 may, for example, be configured to verify the SoR indicator using a message authentication code (MAC-S) received as part of the communication. Determination circuitry 842 may also be configured to perform the determination by utilizing a key shared with the HPLMN (e.g., an Authentication Server Function (AUSF) key or a key derived from the AUSF key).

In another aspect of the disclosure, it is contemplated that the determination circuitry 842 may be configured to make a determination that the SoR indicator is either not embedded within the communication or that the SoR indicator failed an integrity check, wherein the steering circuitry 844 may then be configured to lower a priority of the PLMN. If the determination circuitry 842 indeed determines that the SoR indicator is not embedded within the communication or that the SoR indicator failed an integrity check, the steering circuitry 844 may then be configured to switch from the PLMN to an alternative PLMN, if any alternative PLMNs are available.

The determination circuitry 842 may also be configured to make a determination that an SoR indicator is embedded within the communication and that the SoR indicator passed an integrity check, wherein the steering circuitry 844 may then be configured to ascertain whether the communication is further embedded with updated steering information. Here, the steering circuitry 844 may then be configured to update steering information, if the communication is embedded with the updated steering information. Alternatively, the steering circuitry 844 may then be configured to remain connected with the PLMN, if the communication is not embedded with the updated steering information.

Similar to the processing circuit 604 of FIG. 6, the processing circuit 804 is responsible for managing the bus 802 and general processing, including the execution of software stored on the computer-readable medium 806. The software, when executed by the processing circuit 804, causes the processing system 814 to perform the various functions described below for any particular apparatus. The computer-readable medium 806 and the memory 805 may also be used for storing data that is manipulated by the processing circuit 804 when executing software.

The processing circuit 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. Similar to computer-readable medium 606, computer-readable medium 806 may be a non-transitory computer-readable medium comprising characteristics that are substantially similar. The computer-readable medium 806 may reside in the processing system 814, external to the processing system 814, or distributed across multiple entities including the processing system 814. It should also be appreciated that, similar to computer-readable medium 606, computer-readable medium 806 may be embodied in a computer program product comprising characteristics that are substantially similar.

In one or more examples, the computer-readable storage medium 806 may include receiving instructions 852 configured to perform various functions, including, for example, to receive a communication from a PLMN, wherein the communication indicates an acceptance of a UE registration with the PLMN. As illustrated, the computer-readable medium 806 may also include determination instructions 854 configured to perform various functions. For instance, determination software 854 may be configured to perform a determination of whether a SoR indicator associated with a HPLMN is embedded within the communication. The computer-readable medium 806 may further include steering instructions 856 configured to perform various functions, including, for example, to manage PLMN selection according to the determination. To this end, it should be appreciated that, the combination of the receiving software 852, the determination instructions 854, and the steering instructions 856 may be configured to implement one or more of the functions described herein.

In a particular configuration, it is also contemplated that the UE 800 includes means for a communication from a PLMN, means for performing a determination of whether an SoR indicator associated with a HPLMN is embedded within the communication, and means for managing PLMN selection according to the determination. In one aspect, the aforementioned means may be the processing circuit 804 configured to perform the functions recited by the aforementioned means. In another aspect, the aforementioned means may be a circuit or any apparatus configured to perform the functions recited by the aforementioned means.

Figure 9:
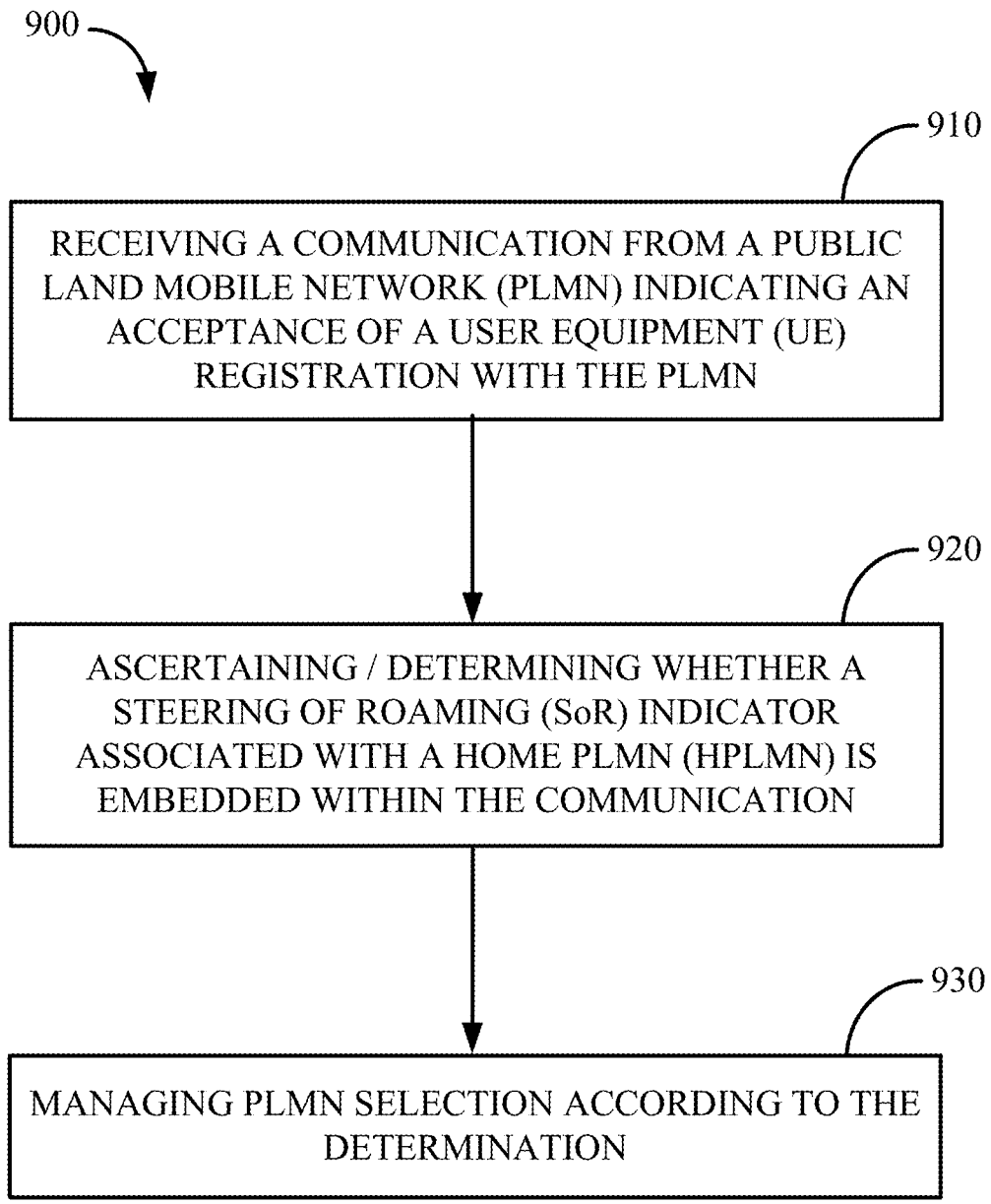
FIG. 9 is a flow chart illustrating an exemplary user equipment process that facilitates some aspects of the disclosure.

Of course, in the above examples, the circuitry included in the processing circuit 804 is merely provided as an example, and other means for carrying out the described functions may be included within various aspects of the present disclosure, including but not limited to the instructions stored in the computer-readable storage medium 806, or any other suitable apparatus or means described herein, and utilizing, for example, the processes and/or algorithms described in relation to FIG. 9.

In FIG. 9, a flow chart is provided, which illustrates an exemplary UE process for performing some aspects of the disclosure. As described below, some or all illustrated features may be omitted in a particular implementation within the scope of the present disclosure, and some illustrated features may not be required for implementation of all embodiments. In some examples, the process 900 may be carried out by the UE 800 illustrated in FIG. 8. In some examples, the process 900 may be carried out by any suitable apparatus or means for carrying out the functions or algorithm described below.

A process 900 begins at block 910 with the UE 800 receiving a communication from a PLMN indicating an acceptance of a UE registration with the PLMN. Once the communication is received at block 910, process 900 proceeds to block 920 where the UE 800 ascertains or determines whether an SoR indicator associated with a HPLMN is embedded within the communication. Process 900 then concludes at block 930 where the UE 800 manages PLMN selection according to the determination.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method comprising:
    by a user equipment:
        receiving a communication from a first public land mobile network (PLMN), the communication indicating an acceptance of a user equipment registration with the first PLMN, the communication including:
            a steering of roaming (SoR) indicator associated with a home PLMN (HPLMN); and
            steering information comprising a list indicating one or more PLMNs;
        performing an integrity check based at least in part on the SoR indicator included in the communication, which was received from the first PLMN and that indicated the acceptance of the user equipment registration with the first PLMN, comprising:
            determining whether the communication includes the SoR indicator;
            calculating a second SoR indicator using the steering information included in the communication; and
            determining whether the calculated second SoR indicator is the same as the SoR indicator included in the communication; and
        managing PLMN selection for the wireless communication device according to the steering information in response to a passing of the integrity check that was based at least in part on the SoR indicator included in the communication, which was received from the first PLMN and that indicated the acceptance of the user equipment registration with the first PLMN.

2. The method of claim 1, wherein the integrity check is performed using an Authentication Server Function (AUSF) key.

3. The method of claim 1, wherein the integrity check is performed using a key derived from an Authentication Server Function (AUSF) key.

4. An apparatus for wireless communication at a user equipment, the apparatus comprising:
    memory; and
    a processor;
    the memory and processor configured to:
        receive a communication from a first public land mobile network (PLMN), the communication indicating an acceptance of a user equipment registration with the first PLMN, the communication including:
            a steering of roaming (SoR) indicator associated with a home PLMN (HPLMN); and
            steering information comprising a list indicating one or more PLMNs;
        perform an integrity check based at least in part on the SoR indicator included in the communication, which was received from the first PLMN and that indicated the acceptance of the user equipment registration with the first PLMN, comprising:
            determining whether the communication includes the SoR indicator;
            calculating a second SoR indicator using the steering information included in the communication; and
            determining whether the calculated second SoR indicator is the same as the SoR indicator included in the communication; and
        manage PLMN selection for the wireless communication device according to the steering information in response to a passing of the integrity check that was based at least in part on the SoR indicator included in the communication, which was received from the first PLMN and that indicated the acceptance of the user equipment registration with the first PLMN.

5. The apparatus of claim 4, wherein the memory and processor are configured perform the integrity check using an Authentication Server Function (AUSF) key.

6. The apparatus of claim 4, wherein the memory and processor are configured perform the integrity check using a key derived from an Authentication Server Function (AUSF) key.

7. A method comprising:
    by a user equipment:
    receiving a communication from a first public land mobile network (PLMN), the communication indicating an acceptance of a user equipment registration with the first PLMN, the communication including:
        a steering of roaming (SoR) indicator associated with a home PLMN (HPLMN); and
        steering information;

performing an integrity check based at least in part on the SoR indicator included in the communication, which was received from the first PLMN and that indicated the acceptance of the user equipment registration with the first PLMN, comprising:
calculating a second SoR indicator using the steering information included in the communication; and
determining whether the calculated second SoR indicator is the same as the SoR indicator included in the communication; and
managing PLMN selection for the wireless communication device according to the steering information in response to a passing of the integrity check that was based at least in part on the SoR indicator included in the communication, which was received from the first PLMN and that indicated the acceptance of the user equipment registration with the first PLMN.

8. The method of claim 7, wherein the integrity check is performed using an Authentication Server Function (AUSF) key.

9. The method of claim 7, wherein the integrity check is performed using a key derived from an Authentication Server Function (AUSF) key.

10. An apparatus for wireless communication at a user equipment, the apparatus comprising:
memory; and
a processor;
the memory and processor configured to:
receive a communication from a first public land mobile network (PLMN), the communication indicating an acceptance of a user equipment registration with the first PLMN, the communication including:
a steering of roaming (SoR) indicator associated with a home PLMN (HPLMN); and
steering information;
perform an integrity check based at least in part on the SoR indicator included in the communication, which was received from the first PLMN and that indicated the acceptance of the user equipment registration with the first PLMN, comprising:
calculating a second SoR indicator using the steering information included in the communication; and
determining whether the calculated second SoR indicator is the same as the SoR indicator included in the communication; and
manage PLMN selection for the wireless communication device according to the steering information in response to a passing of the integrity check that was based at least in part on the SoR indicator included in the communication, which was received from the first PLMN and that indicated the acceptance of the user equipment registration with the first PLMN.

11. The apparatus of claim 10, wherein the memory and processor are configured perform the integrity check using an Authentication Server Function (AUSF) key.

12. The apparatus of claim 10, wherein the memory and processor are configured perform the integrity check using a key derived from an Authentication Server Function (AUSF) key.

* * * * *